United States Patent

Smith

[11] Patent Number: 5,115,887
[45] Date of Patent: May 26, 1992

[54] COMMON HYDRAULIC CIRCUITRY FOR A SCAVENGE AND TOWING SYSTEM

[75] Inventor: Scott A. Smith, Indianapolis, Ind.

[73] Assignee: General Motors Corporation, Detroit, Mich.

[21] Appl. No.: 688,419

[22] Filed: Apr. 22, 1991

[51] Int. Cl.⁵ .............................................. F01M 1/18
[52] U.S. Cl. ................................. 184/6.4; 184/6.12; 184/6.13; 417/2
[58] Field of Search ...................... 184/6.12, 6.13, 6.1, 184/6.4, 6.11, 7.4; 60/456; 417/2, 249, 426, 286, 287

[56] References Cited

U.S. PATENT DOCUMENTS

| | | | |
|---|---|---|---|
| 1,997,700 | 4/1935 | Short | 184/6.4 |
| 2,440,371 | 4/1948 | Holley, Jr. | 184/6.4 |
| 2,550,967 | 5/1951 | Burks et al. | 184/6.1 |
| 2,642,155 | 6/1953 | Wilhelm, Jr. et al. | 184/6.13 |
| 2,871,981 | 2/1959 | Baits | 184/6.4 |
| 4,891,934 | 1/1990 | Huelster | 184/6.4 |
| 4,976,335 | 12/1990 | Cappellato | 184/6.4 |

Primary Examiner—Ira S. Lazarus
Assistant Examiner—Alan B. Cariaso
Attorney, Agent, or Firm—Donald F. Scherer

[57] ABSTRACT

A transmission transfer case has a sump or reservoir that is lower than the main transmission sump or reservoir. A scavenge pump is provided to prevent excess fluid storage in the transfer case during normal vehicle operation by transferring the fluid stored therein to the main transmission sump. During normal operation and vehicle towing, an output driven pump is provided to supply lubricating fluid to the transfer case components. A control valve, actuated by a signal from the main transmission control, directs fluid to the output driven pump from the main transmission sump during normal operation and from the transfer case sump during towing operation. The control valve also connects the scavenge pump with the transfer case during normal operation. A single supply passage is connected between the transfer case sump and the control valve.

2 Claims, 1 Drawing Sheet

COMMON HYDRAULIC CIRCUITRY FOR A SCAVENGE AND TOWING SYSTEM

BACKGROUND OF THE INVENTION

This invention relates to hydraulic storage and lubrication systems, and more particularly, to such systems as employed in a vehicle transmission. Specifically, this invention relates to the lubrication of elements in a transfer case of a transmission. The transfer case components must be lubricated both during normal vehicle operation and during vehicle towing.

Prior art devices which utilize a scavenge pump and lube pump provide a continuous passage connection from the transfer case sump to the scavenge pump and a separate continuous passage from the transfer case sump to a control valve which controls a sump connection to the lube pump.

SUMMARY OF THE INVENTION

The present invention provides a single passage between the transfer case sump and a control valve. The control valve is operable to connect the transfer case sump to a scavenge pump and a lube pump to the transmission sump during normal operation. When vehicle towing is necessary, the control valve is operable to disconnect the transfer case sump from the scavenge pump, while connecting the transfer case sump to the lube pump, which is simultaneously disconnected from the transmission sump.

It is therefore an object of this invention to provide an improved hydraulic fluid system in a vehicle transmission, wherein a main sump and secondary sump are disposed to collect hydraulic fluid from separate housing, and also wherein, the secondary sump is at a lower vertical position than the main sump, and further wherein a control valve is provided to selectively connect a single hydraulic fluid passage from the secondary sump to scavenge pump during normal vehicle operation and to a lube pump during towing operation of the vehicle.

It is another object of this invention to provide an improved hydraulic fluid system for a vehicle transmission having a plurality of sumps, wherein the number of pump inlet passages from at least one sump is minimized.

It is a further object of this invention to provide an improved hydraulic fluid system for a vehicle transmission having a main sump and a lower secondary sump, wherein the secondary sump has a single passage which is selectively connectible with a scavenge pump or a lube pump in response to the operating mode of the vehicle.

These and other objects and advantages of the present invention will be more apparent from the following description and drawings.

DESCRIPTION OF THE DRAWINGS

An exemplary embodiment of the invention is shown in a diagrammatic representation of a hydraulic fluid system.

DESCRIPTION OF AN EXEMPLARY EMBODIMENT

Figure 1:
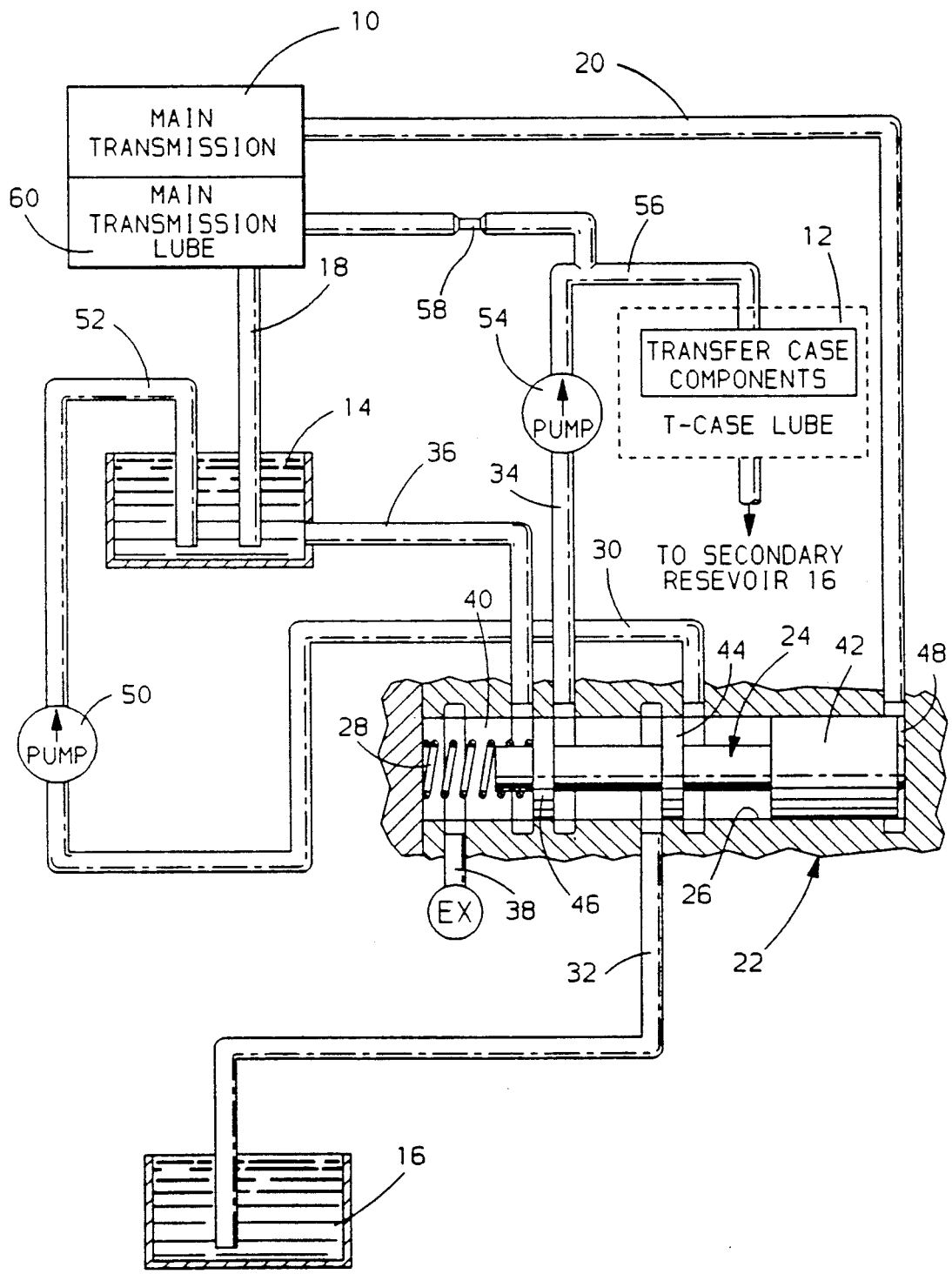

There is seen in the diagrammatic representation a hydraulic system for use with a power transmission which is comprised of a main transmission 10 and a transfer case 12. The main transmission 10 has a transmission sump or primary reservoir 14. The transfer case 12 has a transfer case sump or secondary reservoir 16. The vertical disposition of the primary reservoir 14 is above that of the secondary reservoir 16. This is generally true because of the vehicle disposition and connections between the main transmission 10 and the transfer case 12.

In a typical installation, the transfer gearing, which distributes power to the driving wheels, is driven by gear mechanism disposed within the transmission case and is positioned so that the output shafts of the transfer case are beneath the main transmission. The main transmission is a conventional power transmission device which includes a conventional hydraulic pump, control system, clutches, brakes and gearing. The transfer case 12 houses a conventional transfer gear mechanism which includes gears, shafting and bearing members which are in need of lubrication.

The pump in the main transmission 10 draws fluid, for the operation thereof, from the main reservoir 14 through a passage 18. The main transmission 10 has a signal passage 20 which is pressurized to provide a fluid pressure signal whenever the main transmission 10 is being operated or otherwise being driven by the engine, not shown. The signal passage 20 is in communication with a control valve 22 which is comprised of a spool valve 24, slidably disposed in a valve bore 26 and urged rightward therein by a spring 28. The valve bore 26 is in fluid communication with a scavenge pump inlet passage 30, a transfer case supply passage 32, a lube pump inlet passage 34, a primary reservoir supply passage 36 and an exhaust passage 38.

The exhaust passage 38 is in continuous fluid communication with a chamber 40 in which the spring 28 is disposed. Any fluid entering the chamber 40 will pass through the exhaust passage 38 to the secondary reservoir 16. The valve spool 24 has three equal diameter lands 42, 44 and 46. The valve land 42 cooperates with the valve bore 26 to establish control chamber 48 which is in fluid communication with the signal passage 20.

In the spring set position shown, the valve land 44 is operable to prevent communication between the passages 32 and 30, and the valve land 46 is operable to prevent communication between the passages 34 and 36. The space between valve lands 44 and 46 permit communication between the passages 32 and 34 when the valve spool 24 is in the spring set position.

The valve spool 24 is in the spring set position whenever the main transmission 10 is not supplying pressure in the signal passage 20. This occurs when the vehicle is being towed, since during towing, operation of the vehicle engine is inoperable.

If the main transmission 10 is being driven by the vehicle engine, fluid pressure is generated in passage 20 which will cause the valve spool 24 to move leftward against the spring 28 such that the valve land 44 will be positioned to allow fluid communication between passages 30 and 32 while preventing fluid communication between passages 32 and 34. Also in the pressure set position, the valve land 46 will be positioned to permit fluid communication between the passages 34 and 36.

The passage 30 is in fluid communication and provides inlet fluid to a scavenge pump 50 which, in turn, delivers the fluid through an outlet passage 52 to the primary reservoir 14. The passage 34 provides an inlet passage for a lube pump 54 which, in turn, delivers fluid through a pump outlet or lube passage 56 which is connected to provide fluid lubrication through various components within the transfer case 12 and through a restriction 58 to the main transmission lube circuit 60. The fluid which is delivered for lubrication within the transfer case 12 drains to the secondary reservoir 16.

During normal vehicle operation, the control valve 22 provides selective communication between the secondary reservoir 16 and the scavenge pump 50 via passages 32 and 30. The scavenge pump 50 can be an electrically driven pump, if desired, which functions only at specific levels of fluid within the secondary reservoir 16.

In the alternative, the scavenge pump 50 can be continuously driven by the transmission input thereby providing continuous operation of the scavenge pump 50 during normal transmission operation. Also, when the control valve 22 is in the pressure set position, the lube pump 54 is in fluid communication with the primary reservoir 14 via passages 34 and 36. This ensures that sufficient lubrication is permitted to the transfer case components during normal transmission operation.

There will be times when the vehicle, for one reason or another, will need to be towed. During the towing operation, the main transmission will be inoperable since it is an engine driven device and the engine is inoperable during towing. Therefore, the control valve 22 will be established at the spring set position shown whereby the lube pump 54 is connected for fluid communication with the secondary reservoir 16 via passages 32 and 34. The lube pump 54 is preferably driven by the vehicle output, such that whenever the vehicle is moving across the ground, the pump 54 will operate. Thus, during towing, the lube pump 54 will draw fluid from the secondary reservoir 16 for deliver to the lubrication circuit of the transfer case 12 and the main lube 60.

The components within the transfer case 12 are connected in such a manner that relative rotation of these components will occur during vehicle movement whether through towing or engine driven operation. While the loads imposed on these components are minimal during towing, there is still a requirement for lubrication which is provided by the pump 54. During towing, all of the fluid that is delivered by pump 54 for lubrication of the components within the transfer case 12 and the main transmission 10. The main transmission lube and transfer case lube systems are always linked together via the interface orifice 58. The primary purpose of this orifice is to provide some lube to the main transmission during towing operation. Lube overflow in the main transmission 10 during towing can return to the transfer case via lines 36 and exhaust 38. During normal running conditions, lube oil can flow in either direction through the interface orifice depending on the differential pressure.

The passage 32 provides a simple and single connection between the secondary reservoir 16 and the control valve 22, thus reducing the plumbing complexity which might otherwise be present if when the secondary reservoir 16 is connected to both pump 50 and to a control valve.

The embodiments of the invention in which an exclusive property or privilege is claimed are defined as follows:

1. A hydraulic fluid system comprising in combination: first sump means; second sump means disposed at a vertical position lower than said first sump for receiving hydraulic fluid drained from a predetermined portion of a transmission; first pump means for drawing hydraulic fluid from said second sump means for delivery to said first sump means during normal operation of said transmission; second pump means for delivering lubricating hydraulic fluid to said predetermined portion of said transmission during normal operation and during towing operation; control valve means for directing hydraulic fluid to said first and second pump; a single passage connecting said second sump to said control valve means; control signal means for controlling said control valve means in response to normal operation of said transmission for positioning said control valve means to connect said first pump to receive hydraulic fluid from said second sump and to connect said second pump to receive hydraulic fluid from said first sump; and spring means for positioning said control valve means in a second position for simultaneously disconnecting said first and second pumps from said second and first sumps respectfully and for connecting said second pump to said second sump to permit delivery of lubricating hydraulic fluid from said second sump to said predetermined portion of said transmission.

2. A hydraulic fluid system comprising in combination: first sump means; second sump means disposed at a vertical position lower than said first sump for receiving hydraulic fluid drained from a predetermined portion of a transmission; first pump means for drawing hydraulic fluid from said second sump means for delivery to said first sump means during normal operation of said transmission; second pump means for delivering lubricating hydraulic fluid to said predetermined portion of said transmission during normal operation and during towing operation; control valve means for directing hydraulic fluid to said first and second pump; a single hydraulic fluid passage means connecting said control valve means for providing the sole source of hydraulic fluid from said second sump; control signal means for controlling said control valve means in response to normal operation of said transmission for positioning said control valve means to connect said first pump to receive hydraulic fluid from said second pump and to connect said second pump to receive hydraulic fluid from said first sump; and spring means for positioning said control valve means in a second position for simultaneously disconnecting said first and second pumps from said second and first sumps respectfully and for connecting said second pump to said second sump to permit delivery of lubricating hydraulic fluid from said second sump to said predetermined portion of said transmission.

* * * * *